United States Patent [19]

Cook

[11] Patent Number: 4,742,686
[45] Date of Patent: May 10, 1988

[54] PROCESS FOR INCREASING TREE NUT SHELLING EFFICIENCY

[76] Inventor: Douglas P. Cook, 220 Main St., Summerville, W. Va. 26651

[21] Appl. No.: 10,589

[22] Filed: Feb. 3, 1987

[51] Int. Cl.$^4$ ............................................. F25D 17/02
[52] U.S. Cl. ............................................. 62/64; 62/320; 99/517; 99/538; 99/568; 241/23; 241/DIG. 37; 426/482; 426/524; 426/632
[58] Field of Search .......................... 62/64, 373, 320; 241/23, DIG. 37; 426/482, 483, 524, 632; 99/517, 568, 538

[56] References Cited

U.S. PATENT DOCUMENTS

| | | | |
|---|---|---|---|
| 3,214,928 | 11/1965 | Oberdorfer | 62/64 |
| 3,413,818 | 12/1968 | Pelmulder | 62/64 |
| 3,452,936 | 7/1969 | Hanser et al. | 241/DIG. 37 |
| 4,004,037 | 1/1977 | Connick | 426/633 |
| 4,177,296 | 12/1979 | Mochizuki et al. | 426/632 |
| 4,436,757 | 3/1984 | Lange et al. | 426/482 |

Primary Examiner—Ronald C. Capossela

[57] ABSTRACT

A process for increasing tree unit shelling efficiency includes a means of temporarily hardening the kernels of unshelled nuts to increase the efficiency of conventional nut hulling and/or shelling means. Quick freezing is used to sufficiently lower the temperature of the kernels of unshelled nuts to freeze the liquid matter contained in the kernels with minimal ice crystal formation. A higher percentage of nut kernels remain intact during hulling and/or shelling. The hulls and/or shells of the nuts remain substantially unaffected by quick freezing.

2 Claims, 1 Drawing Sheet

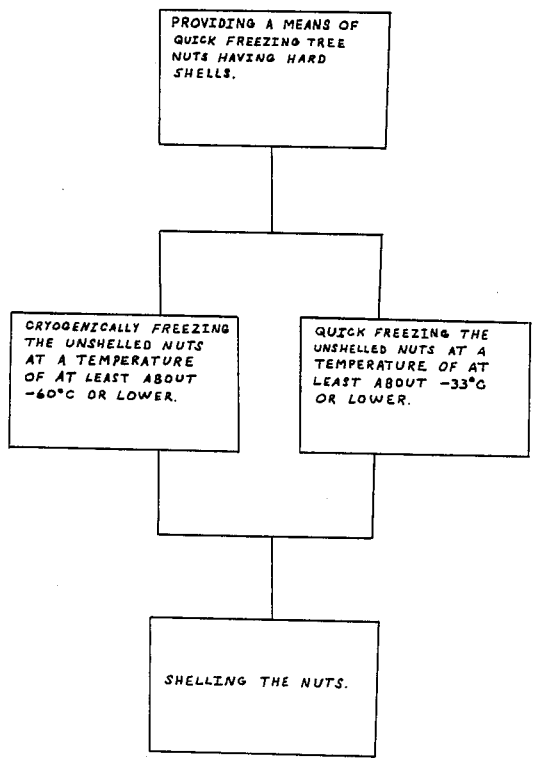

FIG. 1

```
┌─────────────────────┐
│ PROVIDING A MEANS OF│
│ QUICK FREEZING TREE │
│ NUTS HAVING HARD    │
│ SHELLS.             │
└──────────┬──────────┘
           │
    ┌──────┴──────┐
    │             │
┌───┴──────────┐ ┌┴─────────────────┐
│CRYOGENICALLY │ │QUICK FREEZING THE│
│FREEZING THE  │ │UNSHELLED NUTS AT │
│UNSHELLED NUTS│ │A TEMPERATURE OF  │
│AT A TEMP. OF │ │AT LEAST ABOUT    │
│AT LEAST ABOUT│ │-33°C OR LOWER.   │
│-60°C OR LOWER│ │                  │
└──────────────┘ └──────────────────┘
           │
┌──────────┴──────────┐
│ SHELLING THE NUTS.  │
└─────────────────────┘
```

- Cryogenically freezing the unshelled nuts at a temperature of at least about −60°C or lower.
- Quick freezing the unshelled nuts at a temperature of at least about −33°C or lower.

PROCESS FOR INCREASING TREE NUT SHELLING EFFICIENCY

BACKGROUND OF THE INVENTION

This invention relates in general to nuts and in particular processes for increasing tree nut shelling efficiency.

Many varieties of tree nuts are difficult to hull and/or shell because as much as several hundred pounds of force are required. This much force is enough to crush the kernels contained within the hulls and/or shells of the nuts. Elaborate nut hulling and/or shelling means have been devised to prevent crushing the soft kernels. Nevertheless, preparatory processes are needed to increase efficiency of nut hulling and/or shelling means. However, conventional preparatory processes remain expensive, complicated, time consuming, and efficient.

Most nut hulling and/or shelling preparatory processes include soaking the unshelled nuts in water for a certain length of time to soften the hulls and/or shells. In some processes, the unshelled nuts are boiled or steamed to soften the hulls and/or shells. A combination of soaking, boiling, and steaming may also be employed. The time involved in these conventional processes varies greatly, depending on the variety of nut. A plurality of vats and a heating element are needed for the alternate soaking and boiling technique, thus a large amount of money invested in equipment. A further disadvantage of the conventional process is the transfer of the nuts from one vat to another at precise times, thus adding to the complexity of convention nut hulling and/or shelling preparatory processes.

The greatest disadvantage of conventional processes is their inefficiency. No conventional preparatory process is designed to protect the kernels of the nuts by hardening them. In the conventional processes, the shells remain harder than the kernels, thereby allowing a certain percentage of the kernels to be crushed in the shelling process.

SUMMARY OF THE INVENTION

A process for increasing tree nut shelling efficiency according to one embodiment of the present invention utilizes quick freezing as a means of temporarily hardening the kernels of unshelled nuts. Quick freezing minimizes ice crystal formation in the tree nut kernels.

A major advantage of the present invention over conventional processes in the increased efficiency of the process. The conventional nut hulling and/or shelling processes soften the shells; whereas, the present invention hardens the kernels. The present invention can be used in conjunction with almost any commercially used mechanical shelling means. These objects of the present invention provide a less complex, less time consuming, and much more efficient nut hulling and/or shelling preparatory process. Related objects and advantages of the present invention will be apparent from the following description.

BRIEF DESCRIPTION OF THE DRAWING

FIG. 1 is a flow chart of the present invention.

DETAILED DESCRIPTION OF THE INVENTION

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therin being contemplated as would normally occur to one skilled in the art to which the invention relates.

Referring to FIG. 1, there is illustrated a flow chart showing the sequential steps of a process for increasing tree nut shelling efficiency. The first step is providing a means of quick freezing tree nuts having rigid shells. Suitable apparatus and techniques for such means of quick freezing are disclosed in, for example, U.S. Pat. No. 3,214,928 (issued Nov. 2, 1965 to Oberdorfer); and U.S. Pat. No. 3,413,818 (issued Dec. 3, 1968 to Pelmulder). These patents are incorporated herein by reference. Generally, they disclose apparatus for quick freezing food products by treatment with cryogenic fluids, particularly liquid nitrogen or liquid carbon dioxide, comprising a source of cryogenic fluid, inlet valves for the fluids, conveyance systems, and treatment zones for the food products.

It has been found that the relative rigidity of the tree nut shell is important to the novel results of the present invention as opposed to a semi-hard or soft nut shell. Also, the present invention produces the greatest shelling efficiency in tree nuts with kernels that have a rounded shape concentrically located within the nut shell, for example Brazil nuts.

In the second step of the present invention, the tree nuts are quick frozen at a temperature of at least about $-33°$ C. to minimize ice crystal formation in the cells of the nut kernels. The quality of the nut kernel is maintained when there is little or no ice crystal formation in the nut kernel cells. The preferred temperature to quick freeze the tree nuts is at least about $-60°$ C. which comprises cryogenic freezing. Cryogenic freezing is shown as an alternate method of quick freezing in the flow chart (FIG. 1).

The third step of the present invention consists of shelling the nuts by conventional mechanical means while the kernels are still harder than the shells. A commonly used mechanical means of shelling tree nuts is percussion; i.e., fracturing the nut shell by high speed impact. The present invention can be used in conjunction with almost any conventional mechanical shelling means. This is an important advantage of the present invention from the standpoint of avoiding the expense of replacing obsolete equipment experienced with the introduction of a new technology.

The end result of the process is the production of shelled nuts with minimal damage to the nut kernels. The shelled nuts are subsequentially cooled to room temperature and then prepared for consumption.

The present invention can be modified to adapt it to new applications without departing from the spirit and scope of the appended claims. Additional applications for the present invention include using the invention in conjunction with conventional nut hulling and/or shelling preparatory processes.

What is claimed is:

1. A process for increasing tree nut shelling efficiency comprising the steps of:
   A. providing a means of quick freezing tree nuts having hard shells, and then,
   B. quick freezing the unshelled nuts at a temperature of at least about $-33°$ C. or lower to minimize ice crystal formation in the cells of the nut kernels whereby the nut kernels become harder than the nut shells, and immediately thereafter, C. shelling the nuts by conventional mechanical shelling means while the kernels are still harder than the shells, thereby minimizing nut kernel damage.

2. The process of claim 1 wherein quick freezing includes means for cryogenic freezing with a preferred temperature of at least about −60° C. or lower.

* * * * *